Nov. 14, 1961 W. F. LANDRUM 3,008,260
FISHHOOK REMOVING TOOL
Filed Oct. 2, 1958
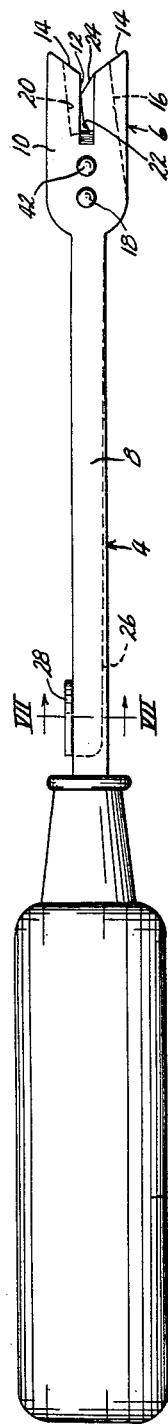
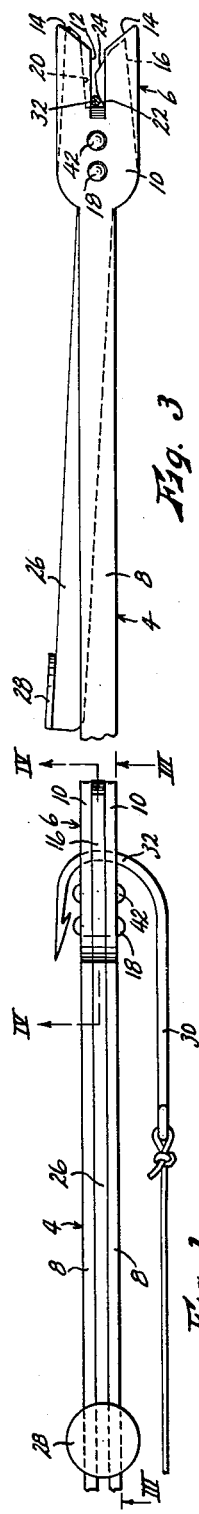
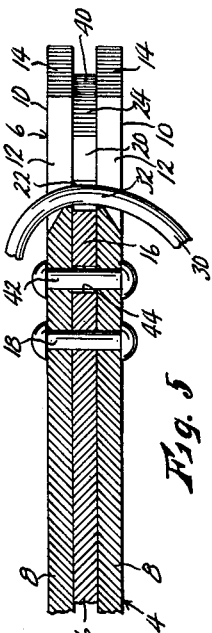
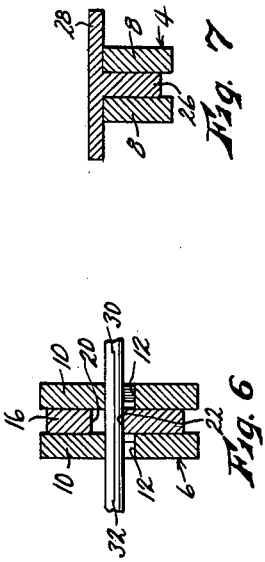
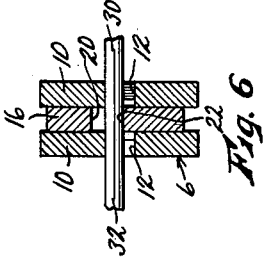
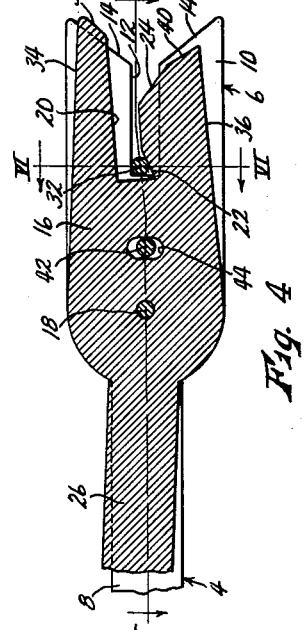
INVENTOR.
William F. Landrum
BY
John A. Hamilton
Attorney.

United States Patent Office 3,008,260
Patented Nov. 14, 1961

3,008,260
FISHHOOK REMOVING TOOL
William F. Landrum, 2659 Grandview Blvd.,
Kansas City, Kans.
Filed Oct. 2, 1958, Ser. No. 764,826
2 Claims. (Cl. 43—53.5)

This invention relates to new and useful improvements in fishing accessories, and has particular reference to a tool for removing fishhooks from the mouths of fish.

The principal object of this invention is the provision of a tool of the character described which is especially adapted for removing a fishhook which a fish has swallowed to an extent such as to make access thereto difficult. In many instances the hook may become set so far down inside the fish's mouth that it is difficult even to see, and more difficult to reach and manipulate with ordinary removing tools. To this end, ancillary objects of the invention are the provision of a fishhook removing tool including a hook gripping device mounted at one end of a slender shank so that the device may be inserted conveniently and deeply into the fish's mouth, the provision of means whereby the gripping device may be operated remotely from the gripping jaws, the provision of a gripping device which is specially formed to "find" and engage a hook even though the hook is not visible, and the provision of means indicating positively to the operator that the gripping device has engaged the hook.

Other objects are simplicity and economy of construction, efficiency and dependability of operation, and adaptability for gripping and manipulating objects other than fishhooks.

With these objects in view, as well as other objects which will appear in the course of the specification, reference will be had to the drawing, wherein:

FIG. 1 is a side elevational view of a fishhook removing tool embodying the present invention, FIG. 2 is a fragmentary edge view of the tool as shown in FIG. 1, showing the shank and head portions thereof in operative relationship to a fishhook, FIG. 3 is a slightly irregular sectional view taken on line III—III of FIG. 2, FIG. 4 is an enlarged fragmentary sectional view taken on line IV—IV of FIG. 2, FIG. 5 is a sectional view taken on line V—V of FIG. 4, FIG. 6 is a fragmentary sectional view taken on line VI—VI of FIG. 4, and FIG. 7 is an enlarged sectional view taken on line VII—VII of FIG. 1.

Like reference numerals apply to similar parts throughout the several views, and the numeral 2 applies to a handle in which is fixed one end of a slender, elongated shank 4 having an enlarged head 6 at its outer end. Shank 4 is formed by a pair of planar, parallel, spaced apart side plates 8 both fixed in handle 2, and head 6 is formed by identically shaped wider end portions 10 of said side plates. The head portions 10 each have a notch 12 formed inwardly from the outer end thereof, the side walls of said notches being parallel, and spaced apart a distance slightly greater than the thickness of the wire of the largest fishhook on which the tool is to be used. The ends of members 10, at each side of notches 12, are bevelled as indicated at 14 to provide a widely flared tapering entry to notches 12. Head 6 constitutes the fixed jaw of a clamping device.

A movable jaw member 16 is disposed slidably between side plate portions 10, being pivoted thereto by means of a rivet 18 extending between and connecting portions 10, said rivet being disposed adjacent the end of head 6 opposite from notches 12, but in alignment with said notches. Jaw 16 is provided with a notch 20 corresponding to notches 12 of the head 6, being of substantially the same width as notches 12, and extending inwardly from the free end of said jaw to substantially the same distance as notches 12. Adjacent the base of notch 20, a side wall thereof is bevelled to provide a side notch 22, so that the base portion of the notch is taperingly enlarged. At the open end of notch 20, the same wall thereof in which side notch 22 is formed is bevelled as at 24 to provide a flared entry to notch 20.

Integral with jaw member 16 is a handle lever 26 which extends rearwardly between side plates 8 of shank 4 to a point adjacent handle 2. A circular thumb-piece 28 is welded or otherwise fixed to the rearward end of said lever and normally lies against one side of shank 4 as in FIGS. 1 and 7.

In use, the tool is first positioned as in FIG. 1, lever handle 26 lying entirely between side plates 8 of shank 4, and thumb-piece 28 lying against said shank. It will be seen that in this position notch 20 of movable jaw 16 is moved out of registry with notches 12 of head 6, and that said movable jaw thus blocks the entry to notches 12. The bevel 24 of said movable jaw extends angularly across the entry portions of notches 12, as shown. In this position, the operator, using handle 2 to manipulate the tool, inserts head 6 into the fish's mouth, and probes about until said head encounters the fishhook 30, and the notches 12 of the tool head 6 engage the bight portion 32 of said hook. The widely flared entry to notches 12 provided by bevelled edges 14 of the head greatly facilitates guiding the tool notches 12 over the hook even when the hook is difficult or impossible to see clearly.

As the hook enters notches 12, it engages the bevel 24 of the jaw 16, and cams said jaw pivotally about rivet 18 in a clockwise direction as viewed in FIG. 1. This moves jaw 16 so that notch 20 thereof registers with notches 12 of the head, so that the tool can be inserted still farther till the bight 32 of the hook is disposed in the base portions of notches 12, and at the same time flips lever handle 26 outwardly from shank 4, as indicated in FIG. 3. This serves as a visual indication to the operator that the hook has been engaged and is ready for removal. Then, using the thumb of the hand with which he grasps handle 2, the operator presses thumb-piece 28 toward shank 4. This pivots jaw 16 to cause bight portion 32 of the fishhook to be gripped tightly between side notch 22 of movable jaw 16, and the opposite side walls of notches 12, as best shown in FIGS. 4 and 6. The inclusion of the hook portion 32 in notch 22 of jaw 16 prevents the hook from slipping out of notches 12, and the inclination of the wall of notch 22 cams the hook tightly against the end walls of notches 12. The operator then removes the hook from the fish's mouth by manipulating handle 2 while maintaining pressure on thumb-piece 28, turning or twisting the handle to free the hook from the flesh of the fish, and guiding the hook while withdrawing it to prevent resetting of said hook.

The longitudinal side edges of jaw 16, as indicated at 34 and 36 in FIG. 4, are inclined in forwardly converging relation as shown, so that said jaw may be moved pivotally through its entire operative stroke without projecting laterally beyond the side of head 6. Such projection would of course enlarge the overall head dimensions, and decrease the freedom of movement of said head in the fish's mouth. Moreover, it will be seen that when jaw 16 is positioned as in FIG. 1, ready for insertion, the outer end of said jaw is bevelled as at 38 and 40 (see FIG. 4) to lie flush with the bevels 14 of head 6, so as not in any way to obstruct the tapered entry to notches 12 which is provided by bevels 14. Excess pivotal movement of jaw 16 is prevented by a rivet 42 extending between and fixed in head members 10 in parallel relation to but spaced apart from rivet 18, rivet 42 extending through an arcuate slot 44 formed through jaw 16, said slot being concentric with rivet 42, and of the desired angular extent.

While I have shown and described a specific embodiment of my invention, it will be readily apparent that many modifications of structure and operation could be made without departing from the spirit of the invention as defined by the scope of the appended claims.

What I claim as new and desire to protect by Letters Patent is:

1. A fishhook removing tool comprising a handle, a slender shank fixed in and extending outwardly from said handle, a head carried at the outer end of said shank and constituting a fixed jaw of a clamping device, said head comprising a generally planar member having a notch formed therein inwardly from an edge thereof, a movable jaw pivotally connected to said head and constituting a generally planar member extending parallel to said head in planar sliding contact therewith, said movable jaw having a notch formed therein corresponding to the notch of said head and operable by pivotal movement of said movable jaw to be moved between an open position in which the head and jaw notches are in registry and a closed position in which said notches are out of registry, and an operating member connected to said movable jaw and operable to pivot said movable jaw relative to said head, said operating member extending along said shank so as to be manually operable from a point remote from said head, said movable jaw being bevelled at one side of the open end of the notch thereof, said beveled portion providing a cam surface which extends angularly across the open end portion of said head notch when said movable jaw is in its closed position, and which is operable by a fishhook entering said head notch to cam said movable jaw to its open position, whereby said operating member is moved to indicate visually that said fishhook has entered said head notch.

2. A fishhook removing tool comprising a handle, a slender shank affixed at one end in said handle and extending outwardly therefrom, a head carried at the outer end of said shank, said shank being formed by a pair of planar, parallel, spaced apart side plates and said head being formed by transversely enlarged, identically formed portions of said side plates, the outer ends of each of said identically formed portions having a V-notch formed therein and each identically formed portion having a parallel-walled straight notch extending inwardly from the base of said V-notch, a planar movable jaw disposed slidably between said identically formed portions and pivoted thereto about an axis spaced apart from the closed end of said straight notches, said jaw having a notch formed therein operable by pivotal movement thereof to be moved from an open position in registry with said straight head notches to a closed position out of registry with said head notches, and an operating lever affixed to said movable jaw and extending between the side plates of said shank to a point adjacent said handle, said movable jaw being bevelled at one side of the open end of the notch thereof to provide a cam surface extending angularly across said straight head notches when said movable jaw is in its closed position, whereby a fishhook entering said head notches will cam said movable jaw to its open position.

References Cited in the file of this patent
UNITED STATES PATENTS

| | | |
|---|---|---|
| 1,491,637 | Schrum | Apr. 22, 1924 |
| 2,512,818 | Wikarski | June 27, 1950 |
| 2,619,859 | Peronto | Dec. 2, 1952 |
| 2,789,860 | Knowles | Apr. 23, 1957 |
| 2,836,004 | Stader | May 27, 1958 |